United States Patent
Belt (10) Patent No.: US 7,611,611 B2
(45) Date of Patent: Nov. 3, 2009

(54) STRUCTURE OF AN ELECTRODE FOR USE IN AN ELECTROLYTIC CELL

(75) Inventor: Jarle Belt, Sagväg (NO)

(73) Assignee: ORO, AS, Bergen (NO)

( * ) Notice: Subject to any disclaimer, the term of this patent is extended or adjusted under 35 U.S.C. 154(b) by 791 days.

(21) Appl. No.: 10/526,032

(22) PCT Filed: Aug. 26, 2003

(86) PCT No.: PCT/NO03/00296

§ 371 (c)(1),
(2), (4) Date: Sep. 9, 2005

(87) PCT Pub. No.: WO2004/018733

PCT Pub. Date: Mar. 4, 2004

(65) Prior Publication Data

US 2006/0144709 A1 Jul. 6, 2006

(30) Foreign Application Priority Data

Aug. 26, 2002 (NO) .................................. 20024054

(51) Int. Cl.
*C25B 9/04* (2006.01)
*C25B 9/02* (2006.01)

(52) U.S. Cl. .................... 204/268; 204/269; 204/275.1; 204/278.5; 205/758

(58) Field of Classification Search ................ 204/268, 204/269, 275.1, 278.5; 205/758
See application file for complete search history.

(56) References Cited

U.S. PATENT DOCUMENTS

| 4,345,986 A | * | 8/1982 | Korach ........................ 204/266 |
| 4,911,993 A | * | 3/1990 | Turley et al. .................. 429/27 |
| 6,274,009 B1 | | 8/2001 | Krafton et al. |
| 6,328,875 B1 | | 12/2001 | Zappi et al. |
| 2002/0108852 A1 | * | 8/2002 | Merk et al. .................. 204/268 |

FOREIGN PATENT DOCUMENTS

| EP | 0 322 478 | 7/1989 |
| EP | 0 582 192 | 2/1994 |
| EP | 1 231 298 | 8/2002 |

OTHER PUBLICATIONS

Database WPI, Section Ch, Week 199403, Derwent Publications Ltd., London, GB; AN 1994-022106, XP002261554 & JP 05 329483A (Konica Corp), Dec. 14, 1993 abstract.

* cited by examiner

*Primary Examiner*—Bruce F Bell
(74) *Attorney, Agent, or Firm*—Banner & Witcoff, Ltd.

(57) ABSTRACT

There is disclosed a structure of an electrode for use as an anode and/or a cathode in an electrolytic cell. The electrode structure is characterised by a conductive frame (10) having a number of liquid through flow openings (18) and including means (20) for connection to current a supply, in that one or both plane sides of the frame is covered with a conductive perforated foil or a wire mesh, and the wire mesh includes spacer means (18) being adapted to cover the surface structure of the frame (10). A method for preparing said electrode and use of the anode and cathode are also disclosed.

24 Claims, 6 Drawing Sheets

FIG 1

POS No.
1. Conductor of a material with high conductivity Cu.
2. Wire mesh of noble metal
3. Conductor of a material with high conductivity 316 L
4. Cathode mesh of SS 316L
5. Molded oxidant-resistant isolator

STRUCTURE OF AN ELECTRODE FOR USE IN AN ELECTROLYTIC CELL

CROSS-REFERENCE TO RELATED APPLICATIONS

Not Applicable.

FIELD OF THE INVENTION

The present invention relates to a structure of an electrode for use as an anode/cathode in an electrolytic cell.

BACKGROUND OF THE INVENTION

Known Methods in Use Today

Today anodes (electrodes) are produced by the use of electrolytic coating a substrate with thin layers of precious (noble) metals. However these electrodes have a particularly short lifetime and they do not tolerate being exposed to high voltages over time. If they are exposed to high voltages they will burn. During the process a dissolving/-precipitation occurs from the anode so that it is corroded.

There is also a production of anodes of pure metals or alloys of such metals, and which do not belong to the precious metal group, but these are quickly corroded in use, they do not produce the desired oxidant, nor can they be exposed to the desired voltage.

Another lesser-known method in use today involves that tantalum, iridium, or a mixture of these are rolled down to between 0.015 and 0.035 mm and is welded to a core for an anode which is made of titanium, aluminum or copper. By this method a frictional welding is used. The lifetime for these electrodes is longer than of the electrodes that are made by use of electrolysis. They tolerate substantially higher voltage and current. With these advantages in variables for electrolyses process, i.e., voltages from 0-380V and currents from 0-1000 Amperes, a mixture of oxidants is produced including a very high reactivity, power and possibility for functional balancing of the single oxidants ($Cl_2$, $ClO_3^-$, $O_3$, $O_2$, $H_2O_2$, OH, ClOH, O), exceeding the effect of, and reduces the undesirable effect of oxidants from anodes produced by other methods.

The limitations for the preparation by these methods are the variation span in the mixture of alloys. For example it is known that platinum/iridium-alloys (Pt/Ir) including more than 20% iridium is difficult to roll down to the desired thickness. Today it is known that the alloy can be rolled down to 33 micron (0.033 mm). Higher concentrations of Ir leads to even greater problems, and the prepared foil often becomes brittle. It is also desirable that the foil have a high degree of hardness in order to increase the mechanical resistance to wear and tear. Further the thickness of the foil is decisive in determining how much of certain oxidants is produced in a certain liquid with a given voltage and current. It is further known that for example pure platinum technically may only be rolled down to 15 micron (0.015 mm). Below this thickness it is not possible to obtain a dense foil (without pores).

Recently methods for vacuum/plasma spraying of tantalum and precious metals according to the abovementioned method have extended the potential of use in that methods for spraying of thinner layers have been developed, and at the same time increased the variation span of the mixture of an alloy with 100% pore density, and thus the specific area of use has been extended.

The known electrolytic processes in its simplest form provide $Cl_2$ as an oxidation agent. Further oxidants ($ClO_3^-$, $O_3$, $O_2$, $H_2O_2$, OH, ClOH, O) are however far more chemically reactive, and are provided by coating a substrate with precious metals where a voltage is exposed in a range where the law of Farraday is exceeded.

Of these components the radicals are in particular the most powerful oxidation agents, both with regard to power and non-desirable side-effects (halogenated compounds of organic material). The problem of the known electrolytic processes is that the radicals cannot be utilised since they have a lifetime of a thousandth of a second and are therefore only present very close to the surface of the anode. As only a very small part of the liquid amount that is conducted through an electrolytic cell makes contact with this anodic surface, large amounts of liquids cannot effectively be exposed to radical exposure for reaction with organic compounds, bacteria, virus etc, which is desired to be eliminated from the liquid.

Known electrolytic processes form hydrogen at the cathode. Hydrogen lowers considerably the formation of oxidants by the anode since the hydrogen forms water when it comes in contact with the oxidant. This applies in particular to OH-radicals in contact with hydrogen. The hydrogen gas also reduces the conductivity of the liquid when it is present in the voltage field between the anode and cathode, and in contact with the anode.

It is known from U.S. Pat. No. 6,328,875 that electrolytic cell designs have been developed with anodes/cathodes made of conductive porous elements consisting of metal, including noble metals, or carbon from welded or woven wire cloth, expanded metal or carbon felt, carbon woven cloth or reticulated vitreous carbon and metallic foam. The structure includes an open solution where the effluent is passed in-between a spacer/anode and cathode to open area (open solution). The stack is clamped together and anode/cathode are separated, mono polar or bipolar, by spacer to prevent short-cut. The effluent is then passed in parallel with the anode/cathode/spacer in the process.

Furthermore it is known that U.S. Pat. No. 6,342,151 comprises anodes/cathodes made of permeable conductive material selected from the group consisting of perforated plates, screens, wool, felt and weave made of stainless steel, aluminum, copper, platinized titanium, mixed metal oxides, gold and gold plated steel. Also this electrode uses spacers to prevent short-circuits between anode and cathode when distance between said components is small.

It is well known that spacers increases current consumption in an electrolytic process and reduces flow capacity through the electrode.

It is also well known that fouling due to scaling caused by Mg and Ca content in the effluent treated is a substantial problem with respect to electrolysis. The scaling problem occurs when velocity of Mg and Ca contained effluent (such as sea water) is passed through an anode/cathode reaction. If the velocity of the effluent is too slow, a bridge of crystals will accelerating be built between anode and cathode causing fouling of the process. Increasing the velocity in such extent might prevent this in such extent that all Mg and Ca build up are transported away before it attaches to the cathode. Another way, provided that anode and cathode are of same or equal reactive material, is to alternate the polarity of the anode and the cathode regularly. Then scaling burst off the cathode as it is reverted to anode.

BRIEF SUMMARY OF THE INVENTION

Aspects of the present disclosure describe an electrode of electrically conducting material for use in an electrolytic cell. The electrode may include a spacer composed of a non-conductive material and permitting flow of liquid therethrough, and a conductive frame defining a plurality of liquid through flow openings. The conductive frame may have planar surfaces on either side and may be connectable to a current supply. A conductive perforated foil or a wire mesh is positioned adjacent to one of the planar surfaces of the conductive frame, and the spacer is positioned adjacent to the perforated foil or wire mesh to prevent electrical contact between the conductive frame and a second electrode.

In other aspects, the present disclosure describes a method of preparing an electrode as described above, wherein sheets of perforated foil or wire mesh are anchored to a frame surface of the conductive frame. The method may include subjecting a sheet of perforated foil or wire mesh to a stretch or tension force, and forcing against and fixing to the frame surface the sheet of perforated foil or wire mesh.

In further aspects, the present disclosure describes a method of using electrodes in an electrolytic cell. The method may include stacking and interconnecting a plurality of electrodes to form pairs of anodes and cathodes inside a pipe, causing liquid to flow through said pipe, processing the liquid flowing through the paired electrodes in the pipe, and applying a current to each pair of anode and cathode electrodes.

The invention relates to a method for preparing an electrode structure.

The invention also relates to a use of an electrolytic cell including anode and cathode.

The invention relates to technology concerning the production of oxidants and radicals which are used to oxidizing and eliminating organic material in liquids, and organic materials on particles in liquids, and for destruction of bacteria, spores, micro organisms, algae and viruses.

DETAILED DESCRIPTION OF THE EXAMPLE EMBODIMENTS

It is an object of invention to provide a new and improved construction of the electrode that eliminates energy losses due to need of spacer and still allows close distance between anode and cathode without risk of shortcut.

It is an object of the invention to allow large flow vertical through the electrode while maintaining full effectiveness of the electrolysis in order to prevent fouling due to scaling.

It is an object of the invention to provide a new and improved construction of an electrode to be used to prepare oxidants as mentioned above, for example $Cl_2$, $ClO_3^-$, $O_3$, $O_2$, $H_2O_2$, (OH), (ClOH), (O), and which optimally can utilise the radical production at the surface of the anode.

Further it is an object of invention to provide a new an improved construction of an electrode where a reduced oxidation effect due to hydrogen interference between anode and cathode, and on the cathode, may be eliminated.

It is further an object of invention to bring substantially all liquid in contact with an area close to the anode where the radicals are produced, and where radicals have a lifetime of some thousands of second (milliseconds). As the radicals are the predominant oxidation agent, also with regard to non-desirable side effects of further oxidation agents, it is essential for inventiveness, compared with the state of art technology, that the radical effects on the materials to be disinfected/oxidised, are considerably increased.

It is also an object of the invention to prepare an anode wherein the consumption of energy is considerably reduced when it is connected to a circuit according to the invention in relation to the volume of liquid to be handled.

It is also an object of invention to provide a new and improved method in which it is possible to simply prepare an electrode with a higher performance in use than the previously known electrodes.

Further it is an object of the invention to provide a use of the electrode.

According to the present invention a method is provided which is suitable in using wire, knitted, woven or plaited wire mesh net of metals for use for, and production of an anode and/or a cathode which may be used to produce a mixture of oxidants, and in particular radicals by use of electrolysis.

The invention is characterised in that an anode is assembled with wires or wire mesh, knitted or plaited of tantalum, niobium, hafnium, zirconium, platinum, rhodium, iridium, ruthenium, palladium, or an alloy thereof, or a mixture of different wires of the abovementioned metal.

The invention is characterised in that the cathode is assembled with wires or a wire mesh, knitted or plaited of 316L steelwires, or higher alloyed conductive and resistant material.

Further the invention is characterised in that the wires or anode meshes and cathode meshes may be joined close together without short circuit contact in that a separation mesh, membrane or coarse crossed squared mesh in a non-conductive oxidant resistant material, which is arranged between the anode and cathode in order to separate these to prevent a short circuit contact.

According to a preferred embodiment of the invention, a superior conductive material may be arranged on the anode and cathode, individually or in a coarse square pattern, and may be thereafter insulated by means of oxidant durable insulating material from electrolyte in order to provide an even current through flow over the exposed wire mesh or wire net area.

The invention is characterised in that anode/cathode is arranged in a flow of liquid which has to pass through the anode/cathode, or that the anode/cathode is arranged in a vessel for production of oxidant.

Further, the invention is characterised in that by electrolysing of freshwater one is able to use both cathode mesh and anode mesh in SS316L quality or higher alloyed metal.

Further, the invention is characterised in that by electrolysis of freshwater a woven, knitted or plaited mesh may be replaced with a plate in SS316L which is perforated by means of photochemistry in order to substitute a wire mesh.

Advantages of the Present New Method

By exposing electrical current with high current density exceeding the law of Farraday to a wire assembly or a woven, knitted or plaited mesh of the metal or a precious metal as disclosed above, one achieves a high production of radicals and reactive oxidants. This production implies a particularly high effect by oxidising of organic material and disinfection.

The present invention differs from existing electrolytic cells/processes where the effect of radicals, ozone, hydrogen peroxide, chlordioxide, and hypochlorite is prepared from anodes with a layer of precious metals which produces the reactive oxidants, and by providing an electrode structure whereby the production of radicals may be utilised more optimally than previously.

This may be provided by the anode having a shape including a mesh of metal as disclosed, having a wire distance of from 100 micron to 25000 micron or a square opening of from 18 micron to 25000 micron where the metal is exposed to voltages exceeding the law of Farraday resulting in a high production of oxidant close to the anode.

By using the electrode structure according to the invention the liquid to be handled is brought to pass a wire net mesh where the opening in the wire mesh has an opening size of minimum 15 micron (15 μm). On passing the radical reaction with a lifetime of some thousandth of a second, will act substantially on all the liquid flowing through the wire mesh. Other electrolytic oxidation processes obtain 1-3% radical effect on the surface of the anode. With the present invention one obtains an efficiency of 95-98% utilisation of the radical effect. This is due to the fact that up to 95-98% of the liquid is passing close to the anode where the radicals spend their lifetime in that the liquid in fact flows through the fine-meshed anode.

The present invention differs from the existing electrolytic cells/processes in that the anode and the cathode may be conducted very close together by means of a separation element (spacer) or a separation wire mesh, prepared by a coarse squared non-conducting material.

Figure 1A:
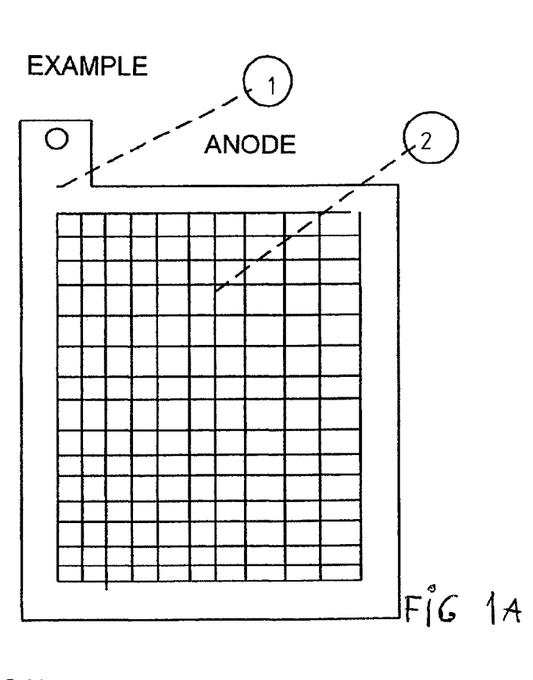
FIG. 1A shows a schematic plan view of an anode 1 of a high conductivity Cu (copper) frame 1 covered with a single wire mesh of a noble metal.
Figure 1B:
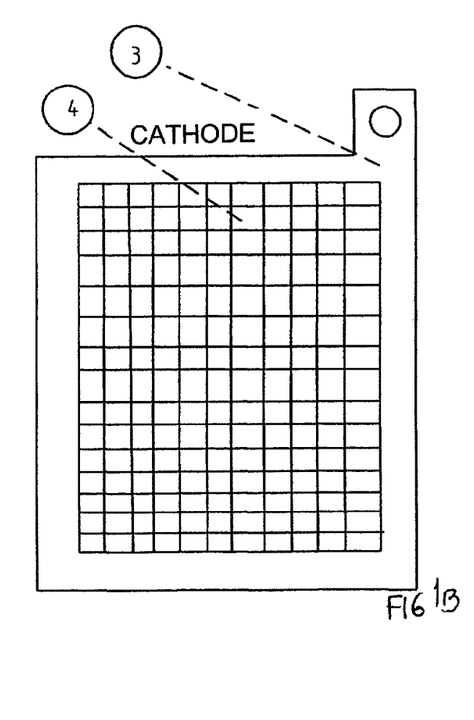
FIG. 1B shows a cathode frame 3 including a woven, knitted or plaited wire mesh 4 (for example of stainless steel 316L). The superior conductor frame 1 to which the wire mesh is fixed, is isolated with a molded oxidant-resistant isolator.
Figure 1C:
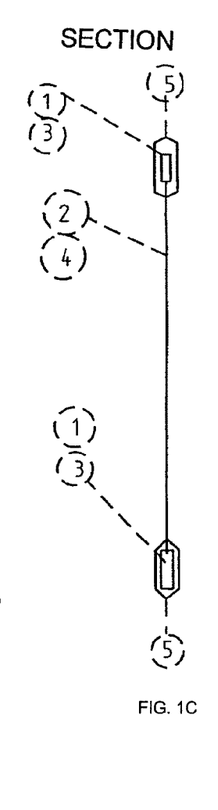
FIG. 1C shows the side section of the oxidant-resistant isolator by reference numeral 5.

According to a preferred embodiment of the invention, it is preferred that each frame is covered by two layers of wire mesh, one layer on each plane side of the frame. It is however sufficient that the frame includes only one wire mesh layer, as shown in FIG. 1A, 1B and 1C.

According to the most preferred embodiment, a wire mesh or parallel threads, 12 and 14, respectively is bounded to each side of the conductor frame 10 by exposing it to a substantial tension force/pressure and possibly by applying heat and using a bonding agent, or by induction welding or laser welding simultaneously with that wire or perforated foil being kept under sufficient tension. Thus the wires or mesh covering the exposed area on each plane side of the conductor are stabilized. Possibly the wire mesh includes parallel threads where each tenth or twentieth thread is of tantalum while the others are platinum threads.

Onto one of wire layers 14 of the frame 10 or said separation wire mesh, a spacer foil 16 (of a polyvinyl choloride (PVC) or polypropylene material) of a non-conducting material, and having the exact shape (plane view) of the frame 10, is positioned and anchored. Thus the openings 18 of the spacer foil 16 are aligned with the through flow openings 18 of the frame 10. Thus the through flow openings 18 of the frame 10 which are "covered" by the wire mesh 12, 14 is not covered by said spacer foil 16. The thickness of the frame 10 may be 5 mm, while the spacer foil 16 may have a thickness as low as 0.3 mm (representing the separation between the anode and cathode surfaces). Thus the water/liquid through flow properties of the frame in use, is not obstructed.

Thus an electrode unit, for an anode or cathode, includes said conductive frame having a number of through flow openings 18, both plane sides of which being covered with the perforated plate, the wires (parallel threads or a wire mesh), and the spacer foil 16 on one side only. Further the conductive frame (for a cathode or anode) 10 includes means 20 for connecting to adequate current supply (voltage and current).

Figure 4A:
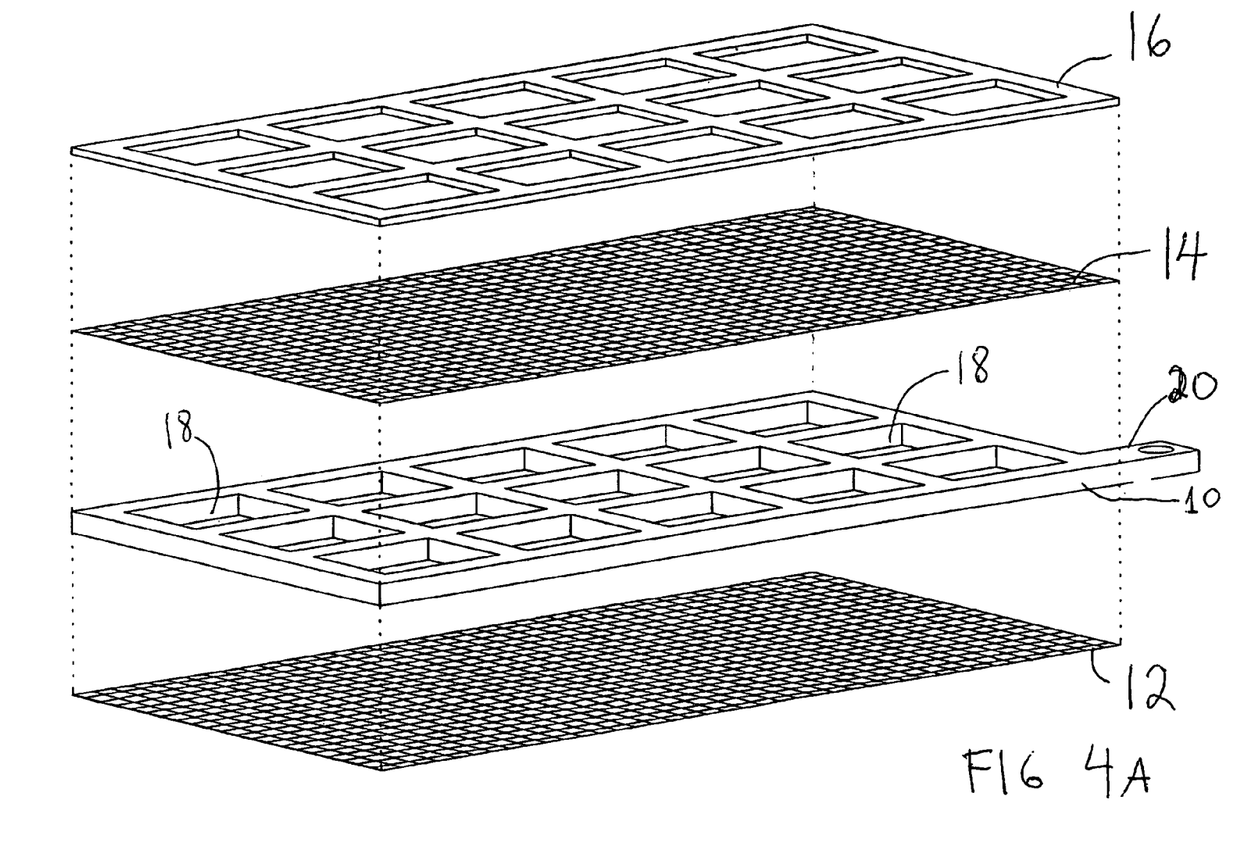
FIG. 4A shows an expanded view of a rectangular electrode structure.
Figure 4B:
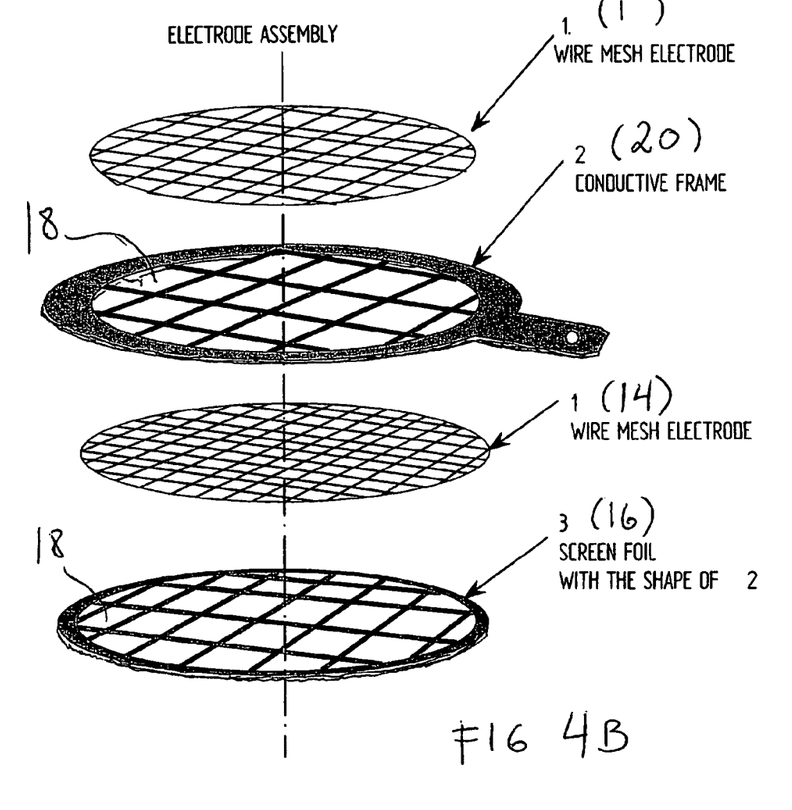
FIG. 4B shows an expanded view of a circular electrode structure according to the invention.

In order to construct a single (the simplest) electrolytic cell, two electrode units as shown in FIGS. 4A-B are mounted mutually close to each other in alignment, so that said spacer layer 16, provides for the necessary distance (for example of 0.3 mm) between the anode surface of one electrode unit and the cathode surface of the adjacent electrode unit.

It is preferred to cover the conductor frame (as being of stainless steel) 10 and the sections of the conductive wire (wire mesh) 12,14 covering said frame, with a non oxidizable material in order to protect against contact with the electrolyte, in a similar manner as shown in FIG. 1C.

Figure 5:
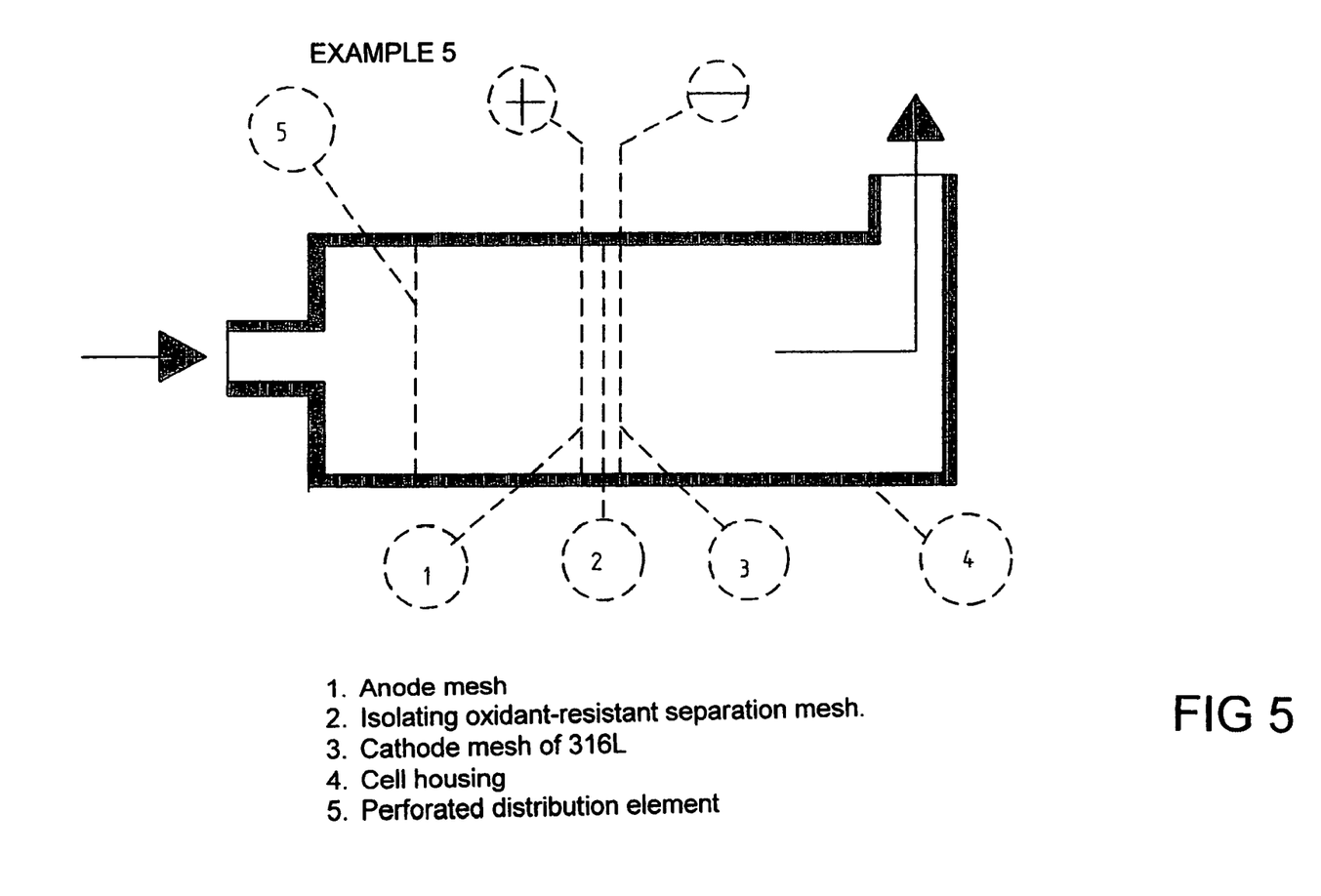
FIG. 5 shows a section of an electrolytic cell (with only one set of an anode and cathode shown for simplicity) made of a wire, plaited, woven or knitted mesh with a separation mesh between the anode and cathode in order to prevent a short circuit contact. The liquid is processed in that it is conducted through the anode and cathode so that hydrogen is conducted out from the cathode and away from the anode.

An electrolytic cell consisting of a number of the above-mentioned pairs of electrode units (up to 50 pairs), may have a circular, or rectangular shape. A circular electrode unit may for example have a diameter of up to 1 meter, representing the water through flow of the unit. The electrolytic cell may be placed into a pipe conducting the water to be treated according to the invention, for example as shown in FIG. 5. When applying a sufficient voltage to the anode/cathode sets, the process water flowing through the unit (the openings 18) of the wire mesh of the unit, obtains a close reactive contact with the oxidants and radicals formed on the anode threads of the wire mesh.

The drawing FIGS. 4A and 4B are expanded views (rectangular and circular versions) of the four layers 20, 12, 14, 16 of which each unit is structured.

FIG. 4B shows the anode or cathode wire mesh where the conductor frame of a superior rigid conductive material is supporting the exposed anode or cathode surface in order to obtain an even current distribution over a large area or in case of high current. The mesh is attached to the conductor frame at both sides. The non-conductive spacing material in the same shape as the rigid conductor frame and attached to one of the meshes at one side.

The assembly of a single anode or cathode can be stacked in numbers from one anode and one cathode up to 50 altogether.

Anode and cathode might be of identical material or different. In case of similar material DC power applied might be alternated to avoid scaling and uneven tear and wear. Anode size might each be more than 1 m diameter. Flow capacity might be from a few liters/hr in the smallest cells to more than 1000 m$^3$/hr in each of the largest cell. Typical current density at 316L anodes is 38 mA/cm$^2$ provided Cl content at 5 ppm. For noble metals the above have been tested to 270 Amp at an anode area of 0.5 cm$^2$.

The wire-mesh may be formed of individual wires mounted parallel to one another to the frame, or of individual wires that are woven, knitted or plaited or induction-welded to form the aforementioned mesh.

Preferably each individual wire or the perforated foil is attached to the conducting frame by use of such that electrical contact is achieved for even current distribution over exposed electrode area and exposed electrode area becomes tension stabilised to eliminate use of conventional spacer, whereupon frame or conductor is isolated from the liquid electrolyte by an oxidant-resistant isolator/coating.

It is preferred to direct the water to be processed through a mechanical particle extractor in order to remove all particles and organisms larger than the light aperture in the electrode.

Further, after the liquid has processed according to the invention it is directed through an hydrophobic adsorption filter or hydrophobic adsorption media in order to remove potential excess organic compounds.

After the treatment, the liquid is preferably directed through a flotation device in order to remove electro flotated organic material.

The exposed gap between anode and cathode does not need conventional or further spacers, as spacing is provided by applying a foil, membrane or coarse of non conductive material of the same shape as the frame itself. The clearance might be as low as 0.3 mm. This implies that by the invention, it is possible to obtain a high current density with a very low voltage, something that easily exceeds the Law of Faraday without flow or current loss due to spacer and provides a desired production of reactive oxidants.

Another advantage by applying wire/mesh or perforated foil at both sides of the conductor frame is that it allows mm² upscaling for extreme currents passing to the exposed area for electrolysis. A 5 mm thick frame covered at both sides allows placement of a thin spacing frame at both sides where the cathode mesh/perforated foil can be placed close to the anode in a distance down to 0.3 mm. With varying distances more than 3000 Amps can be passed through an electrode.

The present invention differs from existing electrolytic cells/processes in that one by means of a very low voltage, may obtain the necessary high current density of large area without this reducing the volume through flow of the liquid to be handled. This also implies that large volumes of liquid to be handled may be treated very cheaply. The volume capacity of the electrolytic cell is not changed in contrast to other electrolytic cells even though the distance between the anode and cathode is reduced from i.e., 5 cm to 0.3 mm in that the same volume-liquid flow goes through the anode and cathode independent of the mutual distance between them.

The present invention differs from the existing anodes in that the use of wires to a considerable degree increases the area of the anode compared to the weight of the metal and the real surface. Thus, the costs of the precious metals are also reduced considerably at the same time as the efficiency per cm², is increased.

The present invention differs from existing electrolytic cells/processes in that it is possible to obtain high current density, a low consumption of energy and a high through flow by volume of liquid, as the distance between the anode and cathode can be reduced to 0.3 mm without this reducing the capacity of the electrolytic cell, so that it may be used with the iron conductivity in fresh water (surface water and ground water).

With the present invention it is possible to combine the effect of different metals. For example, an anode mesh of tantalum including some wires of another precious metal from the platinum group, produces mainly ozone, radicals and hydrogen peroxide, and very little hypo chlorite and chloride dioxide. This is due to the fact that all flow of current will take place from the precious metal wires such as tantalum immediately will immediately obtain an isolating layer of oxide.

The present invention differs from existing electrolytic cells/processes in that it can be used with a low cost for treating large volumes of liquid, such as surface water, fresh water and ground water with the composition existing in great parts of the world today. Even with both anode and cathode of 316 L steel or higher alloyed metal without the anode oxidising or corroding. This is due to a high electrode surface with very low consumption of energy is producing the necessary oxidant (ozone and radicals) even with the average conductivity in ground water and surface fresh water.

The present invention is characterised in that liquid may be conducted through anode and cathode in that a frame of conductive material is fixed to the anode and cathode mesh with sufficient contact, the mesh is preferably conducted at both sides of the frame, and the conductor frame is coated with a non oxidizable material in order to protect against contact with electrolyte. The spacing material in a non-conductive oxidant resistant material may be provided whereafter the anode or cathode mesh is assembled. The spacing material is of identical shape as the conductor frame and of varying thickness.

The device according to the invention will be explained More in detail with reference to the following specification and the following drawings, wherein:

FIG. 1A shows a schematic plan view of an anode 1 of a high conductivity Cu (copper) frame 1 covered with a single wire mesh of a noble metal.

FIG. 1B shows a cathode frame 3 including a woven, knitted or plaited wire mesh 4 (for example of stainless steel 316L). The superior conductor frame 1 to which the wire mesh is fixed, is isolated with a molded oxidant-resistant isolator.

FIG. 1C shows the side section of the oxidant-resistant isolator by reference numeral 5, in addition to the other details of the.

Figures 2, 3:
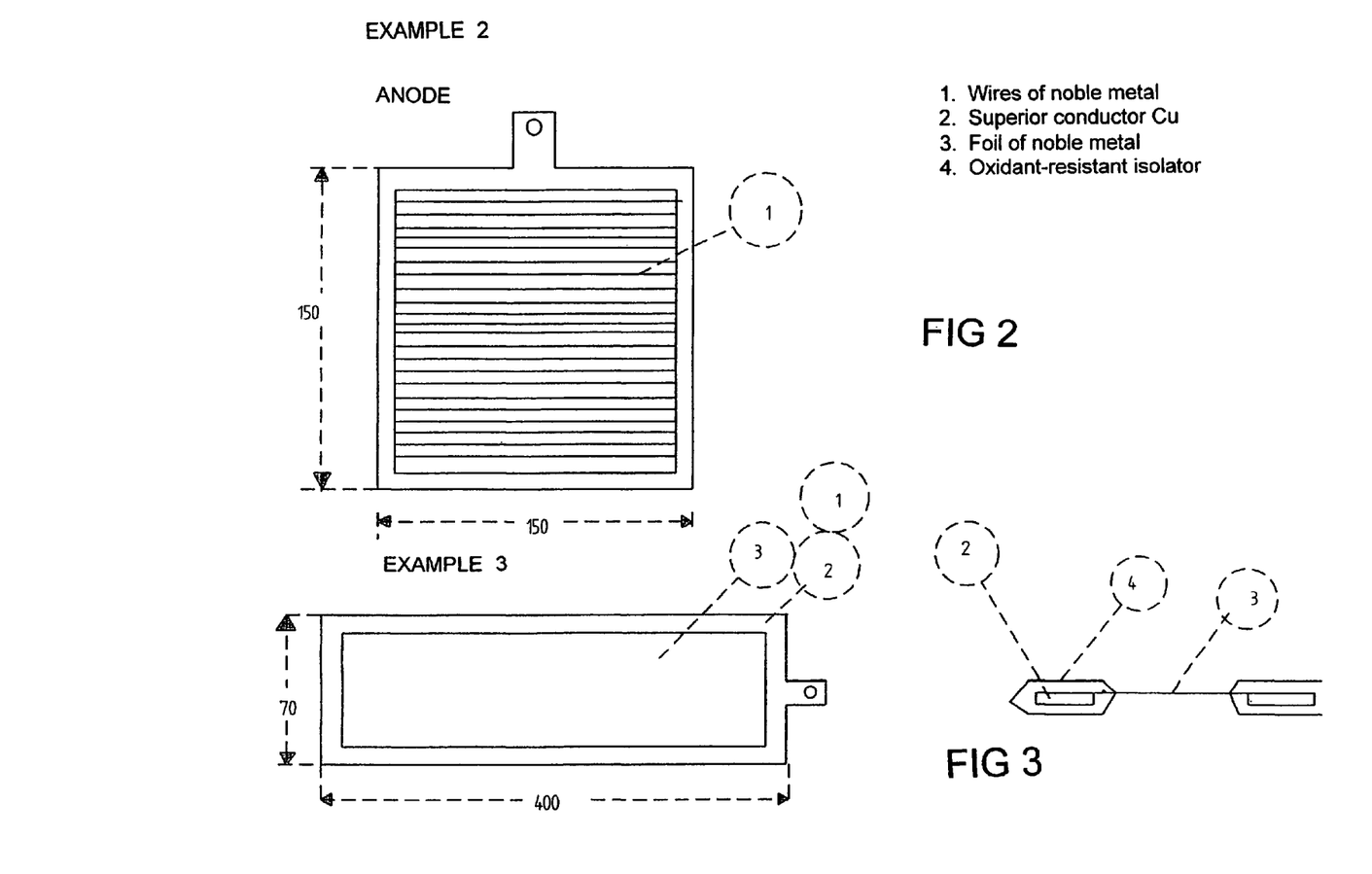
FIG. 2 shows an anode of wires which are fixed to a superior conductor which is isolated.
FIG. 3 shows an anode of a foil which is fixed to a superior conductor which is isolated.

FIG. 2 shows an anode of wires which are fixed to a superior conductor which is isolated.

FIG. 3 shows an anode of a foil which is fixed to a superior conductor which is isolated.

FIG. 4A shows an expanded view of a rectangular electrode structure, and which is disclosed previously in this specification.

FIG. 4B shows an expanded view of a circular electrode structure according to the invention.

FIG. 5 shows a section of an electrolytic cell (with only one set of an anode and cathode shown for simplicity) made of a wire, plaited, woven or knitted mesh with a separation mesh between the anode and cathode in order to prevent a short circuit contact. The liquid is processed in that it is conducted through the anode and cathode so that hydrogen is conducted out from the cathode and away from the anode.

The structure shown in FIG. 5 was used in control and verified experiments for treating the ballast water from ships and including sea water containing bacteria, micro organism, algae and spores. The water including a high degree of pollution, was conducted through the cell once, as shown by arrows, with an amperage of 100 A. The result show that 100% of the abovementioned pollutants, including spores, where destroyed. An extrapolation of the results based on the experiments show that the required consumption of energy will be 5 kWh in order to handle 2500 m³/h process water with an anode surface of 2.5 m².

Similarly the structure as shown in FIG. 5 was used to prove oxidant production in fresh water. With an anode/cathode-distance of 1 mm and an anode of a precious metal mesh produced 0.5 ppm ozone during one through flow. Up scaling models show that 2500 m³/h require 87 kWh with an anode surface of 2.5 m².

The experiment was repeated with an anode mesh and cathode mesh of 316 L steel. During one through flow 0.91 ppm ozone was produced in the drinking water with 80 V and 3 A.

Figure 6:
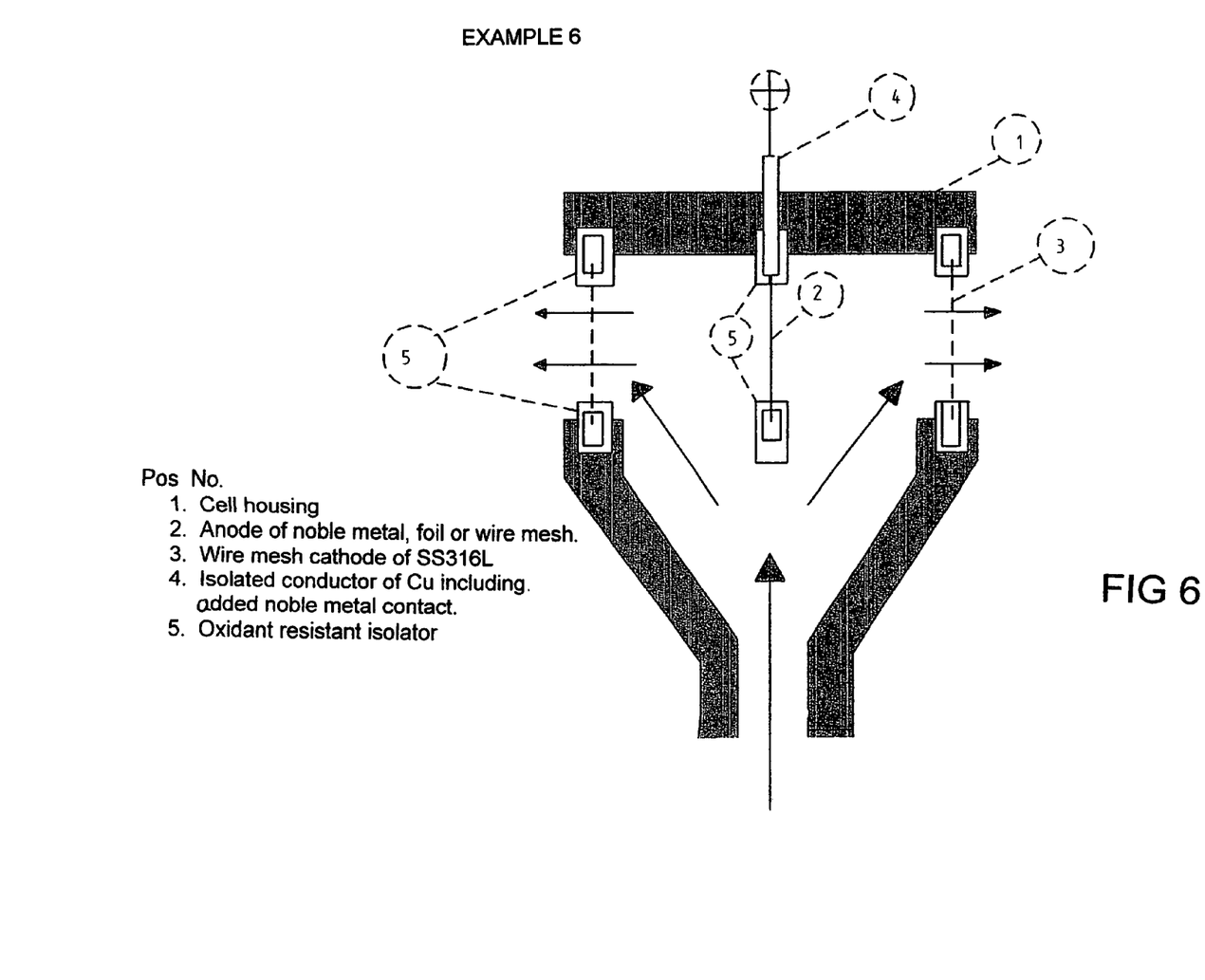
FIG. 6 shows a section of an electrolytic cell.

FIG. 6 shows a section of an electrolytic cell there foil or wire mesh to which a liquid was added to both the plain surfaces whereupon the liquid is conducted through the cathode on each side of the anode so that hydrogen does not come in contact with the anode or in the field between the anode and cathode.

This electrolytic cell was used for destruction of poly aromatic hydrocarbons (PAH) and polychlorinated biphenyls (PCB) on particles in a sea water slurry. With a careful addition of electrolyte and circulation of the mixture during 20 minutes, the PAH-content was reduced by 99.6% and the PCB-content was reduced by 76% based on relatively high concentrations. Some further examples of the invention are now presented.

EXAMPLE 1

An electrode stack as described in FIG. 4B comprising 5 anodes and 6 cathodes all of 316 L steel and a total anode area of 1013 cm² were assembled with a 1 mm spacer. The liquid flow through the cell was at a rate of 10 l/mm. Effluent was untreated drinking water from a surface source with salinity varying between 1.5 and 5 ppm, and with high humic content. *E-coli* bacteria were added to the water at a concentration of 560.000 bacterias/ml. Passed once through the cell with current 20 Amp showed a total disinfection effectiveness in all samples taken after treatment. That is sample series taken between 2 and 20 minutes after passed trough the cell.

The same samples were analyzed for trihalomethanes (Cloro-organic and bromoorganic compounds). These samples showed results in the range of 0.9-2.5 ppb. This is extremely low compared to chlorination of water. Total count of bacteria was more than 10 log 3 by applying 18.5 Amp.

EXAMPLE 2

The same setup and similar water as in EXAMPLE 1 where used but the number of electrodes was multiplied to achieve higher amperage. The scope was to inactivate IPN Virus. Desired 10 log 3 inactivation was achieved at 60 Amp. Furthermore Areomonas Salmonicida was also inactivated with the same log at same conditions. Total restoxidant varied from 0.7 to 1.6 ppm.

EXAMPLE 3

Produced water from oil and gas production containing PAH, Hydrocarbons, Phenols and benzene, ethylbenzene, toluene and xylene (BETX) with significant concentration was passed through 1 noble metal anode of knitted wire cloth and 2 cathodes as shown in FIG. 4B. Amperage was 300 Amp and anode area 180 cm². The flow rate was 180 l/min. Phenols were reduced from 1580 microgram/l to 0.51 microgram/l. PAH 16 was reduced from 34.7 microgram/l to 3.92 microgram/l. Non-polar dissolved hydrocarbons (NPD) was reduced from 114 microgram/l to 3.92 microgram/l total extractable organic matter (TEOM) (C10-C40) was reduced from 16 mg/l to 2.41 mg/l.

EXAMPLE 4

A contaminated fluid from a oil refinery containing 1600 ppm $H_2S$, 2-3% Phenols and 2900 ppm Ammonium was processed through two noble metal wire mesh anodes stacked with 3 cathodes of 316 L steel mesh. Anode area total was 225 cm². Current was 300 Amp. Flow 140 l/mm. Cl-content was 2% NaCl. After batch processing a volume of 40 l for 15 minutes the $H_2S$ was oxidized to 0 ppm and further 15 minutes processing resulted in ammonium content of 3 ppm and Phenol content of 300 ppb. During processing pH was controlled by additives.

EXAMPLE 5

250 g Drill cuttings from oil and gas industry was processed through an electrode under conditions as described in EXAMPLE 4. The cuttings were dispersed into 22 l of effluent containing 6% NaCl. Scope was to remove Hydrocarbons from particles. Initial content of 7.62% total Hydrocarbon vas reduced to 1.32% in an hour processing.

EXAMPLE 6

Deep blue textile dying wastewater was passed through an anode of noble metal threads stretched across a 5 inch diameter circular anode conductor frame so that the area of anode only was 0.5 cm² total. The 2 cathodes was wire mesh of 316L steel. 20 l was batch processed with flow 180 l/mm through the electrode. Volume 20 l. NaCl content 5%. Current was 270 Amp. In 25 to 35 seconds the waste water became blank.

The device, the method and the use according to the invention are characterized by the features appearing in the characteristic clauses of the independent claims.

The further features of the invention are given in the dependent claims, respectively.

The invention claimed is:

1. An electrode of electrically conducting material for use in an electrolytic cell, the electrode comprising:
    a spacer composed of a non-conductive material and permitting flow of liquid therethrough, and
    a conductive frame defining a plurality of liquid through flow openings, the conductive frame having planar surfaces on either side and being connectable to a current supply, wherein a conductive perforated foil or a wire mesh is positioned adjacent to one of the planar surfaces of the conductive frame, and
    wherein the spacer is positioned adjacent to the perforated foil or wire mesh to prevent electrical contact between the conductive frame and a second electrode.

2. The electrode according to claim 1, wherein the wire mesh comprises parallel threads where each tenth or twentieth thread is composed of tantalum and the intermediate threads are composed of platinum.

3. The electrode according to claim 1, wherein wires of the wire mesh are individually spaced from 100 microns to 25000 microns apart, and when woven, knitted, induction-welded or plaited into the wire mesh, have an air aperture between 15 microns to 25000 microns.

4. The electrode according to claim 1, wherein each wire of the wire mesh has a diameter in a range of 0.010 millimeters to 5 millimeters.

5. The electrode according to claim 1, wherein the perforated foil or wire mesh is composed of a material from the group consisting of: tantalum, niobium, hafnium, zirconium, platinum, rhodium, iridium, ruthenium, palladium, any alloy of these, and an alloy or a composition of wires of the different aforementioned metals.

6. The electrode according to claim 1, wherein the perforated foil is composed of a plate in SS316L or higher alloy metal, and which is perforated by photochemistry.

7. The electrode according to claim 1, wherein the spacer defines second through flow openings that are aligned with the through flow openings of the conductive frame.

8. The electrode according to any of preceding claims, wherein the perforated foil is a PVC or polypropylene sheet and is welded to the frame.

9. The electrode according to claim 1, wherein the thickness of the conductive frame is approximately 5 millameters.

10. The electrode according to claim 1, wherein a non oxidizable material covers the conductive frame to protect against contact with the liquid.

11. The electrode according to claim 1, wherein the perforated foil thickness is from 25-1000 microns and diameter of each perforation of the perforated foil is from 25-2000 microns.

12. A method of preparing an electrode according to claim 1, wherein sheets of perforated foil or wire mesh are anchored to a frame surface of the conductive frame, the method comprising:
    subjecting a sheet of perforated foil or wire mesh to a stretch or tension force, and
    forcing against and fixing to the frame surface the sheet of perforated foil or wire mesh.

13. The method of claim 12, wherein the sheets of perforated foil or wire mesh are anchored to the frame in a manner selected from the group consisting of:
    by adhesive operation,
    by friction welding,
    by laser welding,
    by use of pressure or heat, and
    by bonding by exposing the foil or wire mesh to sufficient tension force.

14. A method for using the electrode of claim 1, in an electrolytic cell, the method comprising:
    stacking and interconnecting a plurality of the electrodes to form pairs of anodes and cathodes inside a pipe,
    causing liquid to flow through said pipe,
    processing the liquid flowing through the paired electrodes in the pipe, and
    applying a current to each pair of anode and cathode electrodes.

15. The method of claim 14, further comprising alternately applying direct current to avoid scaling and uneven tear and wear where the anode and cathode are composed of similar materials.

16. The method of claim 14, wherein the distance between an anode surface of one electrode and a cathode surface of the neighboring electrode is approximately 0.3 millimeters.

17. The method of claim 14, further comprising producing oxidants through electrolysis, for oxidation of organic material in liquids, and organic material on particles in liquids.

18. The method of claim 14, further comprising producing oxidants through electrolysis, for oxidation and destruction of bacteria, spores, micro-organisms, algae and viruses in liquids.

19. The method of claim 18, wherein the producing of oxidants through electrolysis is for treatment of fresh water and drinking water by conducting polluted liquids through flow openings of said electrode.

20. The method of claim 18, wherein the producing of oxidants through electrolysis is for destruction of virus, spores and bacteria, and micro organisms, algae and algal cysts smaller than 100 microns in ballast water from ships.

21. The method of claim 14, wherein the liquid that is being treated, before it is treated, is directed through a mechanical particle extractor to remove all particles and organisms larger than light aperture in the electrode.

22. The method of claim 14, wherein the liquid that has been treated, after it is treated, is directed through a hydrophobic adsorption filter or hydrophobic adsorption media to remove potential excess organic compounds.

23. The method of claim 14, wherein the liquid while treated is directed through a flotation device to remove electro floated organic material.

24. The electrode according to claim 1, further comprising a second conductive perforated foil or wire mesh positioned adjacent to the other one of the planar surfaces of the conductive frame.

* * * * *

UNITED STATES PATENT AND TRADEMARK OFFICE
CERTIFICATE OF CORRECTION

| | | |
|---|---|---|
| PATENT NO. | : 7,611,611 B2 | Page 1 of 1 |
| APPLICATION NO. | : 10/526032 | |
| DATED | : November 3, 2009 | |
| INVENTOR(S) | : Jarle Belt | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Fourteenth Day of December, 2010

David J. Kappos
*Director of the United States Patent and Trademark Office*